Nov. 1, 1932.  T. V. BUCKWALTER  1,885,985
AXLE BEARING MOUNTING
Filed June 10, 1931
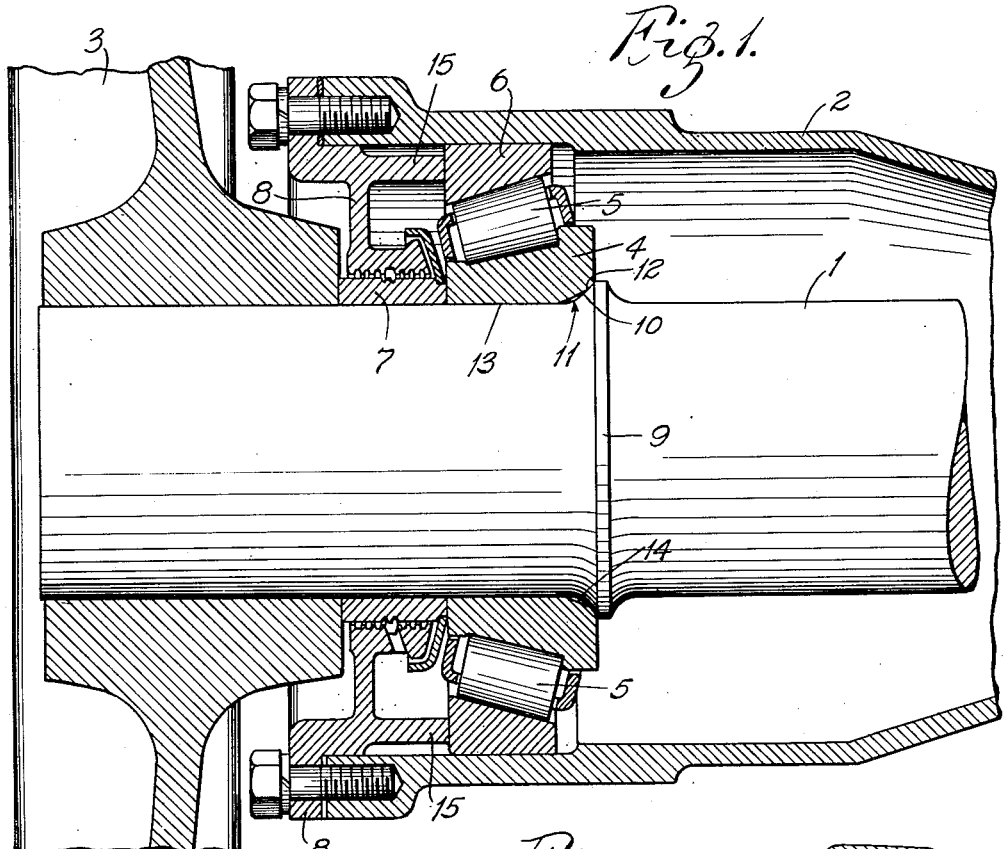
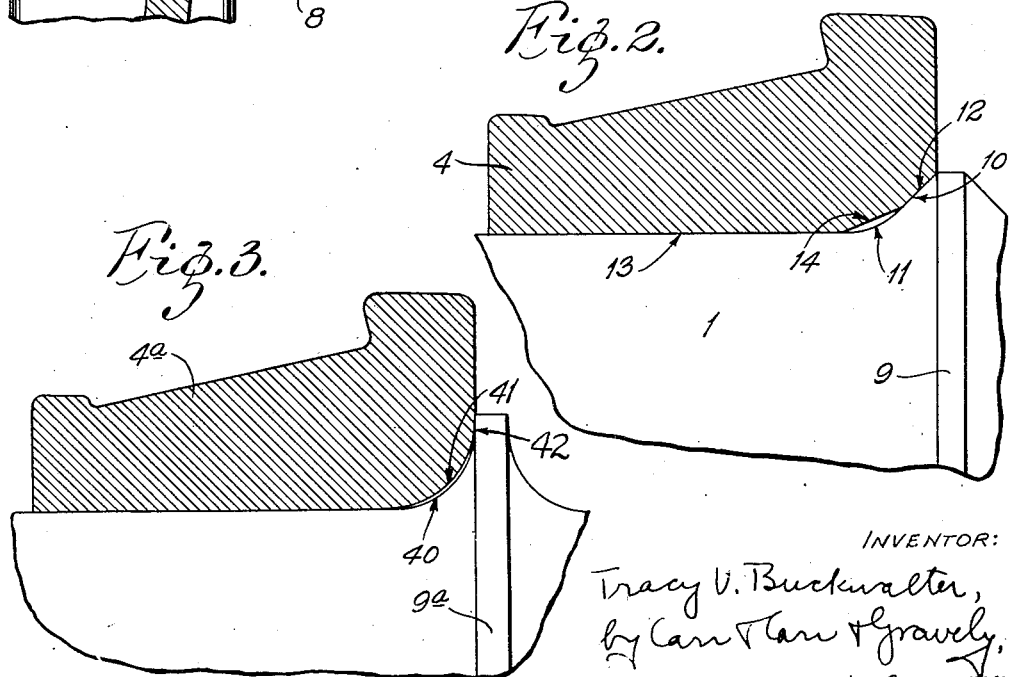
INVENTOR:
Tracy V. Buckwalter,
by Carr Carr & Gravely
HIS ATTORNEYS.

Patented Nov. 1, 1932

1,885,985

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

AXLE BEARING MOUNTING

Application filed June 10, 1931. Serial No. 543,286.

My invention relates to the mounting of anti-friction bearings on axles and the like and is particularly applicable to railway axles and other heavy duty constructions. The invention has for its principal object a construction in which the inner bearing member of an antifriction bearing is firmly seated against an abutment shoulder on an axle so that the adjustment of the bearings may be maintained, in which the stresses resulting from end thrust are distributed over a considerable area instead of being localized and in which the height or outside diameter of the abutment shoulder may be reduced to a minimum, thereby reducing the cost of the axle.

The invention is particularly applicable to an axle construction of the type in which the cone or inner bearing member abuts against a shoulder on the axle and consists in providing the shoulder with a conical portion and providing the bore of said cone with a tapering end portion whose taper or conicity is the same as that of the conical portion of the axle shoulder. The invention further consists in the parts and in the combinations and arrangements of parts hereinafter described and claimed.

In the accompanying drawing wherein like reference numerals refer to like parts wherever they occur, Fig. 1 is a longitudinal sectional view of a portion of a railway car axle construction embodying my invention, Fig. 2 is a fragmentary detail showing, on an enlarged scale, the construction of the abutment shoulder and the inner bearing member; and Fig. 3 is a similar fragmentary view showing an abutment shoulder and inner bearing member as heretofore commonly made.

The drawing illustrates, by way of example, a railway car axle construction in which the solid axle 1 projects at each end beyond the ends of an axle housing 2. A railway car wheel 3 is secured to each end of said axle and a taper roller bearing comprising an annular inner bearing member or cone 4, conical rollers 5 and an outer bearing member or cup 6, is interposed between each end portion of the axle and the axle housing. A spacer ring 7 is mounted on the axle between the inner bearing member 4 and the car wheel and a closure ring 8 is secured to the end of the housing and closely encircles said spacer ring 7.

The inner bearing member 4 abuts against a shoulder 9 on the axle. Said shoulder has its outermost portion 10 of conical shape, said conical portion terminating in a curved portion 11 that merges into the body of the axle 1.

The inner bearing member 4 has the end portion 12 of its bore 13 tapered to conform to the conicity of the conical portion 10 of said shoulder 9, said end portion and the cylindrical body 13 of the bore being connected by a portion 14 that is of less steep taper so as not to contact with the radiused portion of said shoulder.

The spacer ring 7 holds the inner bearing member 4 in position against said shoulder 9. The outer bearing member 6 is held by a flange 15 on said closure ring 8. Thus the bearing adjustment is accurately maintained, except for wear of the parts, which may be compensated for by adjusting said outer bearing member 6.

In the construction heretofore used, as shown in Fig. 3, the shoulder or rib 9a has a concavely curved portion 40 and the end 41 of the bore of the inner bearing member 4a is of convex curvature, the radius of curvature of the inner bearing member being greater than the radius of curvature of the curved portion of the shoulder, so that the inner bearing member contacts with the outer edge portion of the shoulder only, the convexly curved portion of the inner bearing member contacting tangentially with a flat face 42 at the outer edge of the shoulder.

The present construction has numerous advantages. Instead of localizing the stresses, as is the case with prior art constructions, the stresses are distributed by reason of the fact that a considerable portion of the end of the inner bearing member contacts with the conical portion of the axle shoulder. In practice the inner bearing members must fit very tightly on the axle and are usually heated and then permitted to shrink on the axle. In prior art constructions, this sometimes resulted in the inner bearing member pulling entirely away from the rib, so that the bearing adjustment would later be lost; whereas in the present construction the shrinking of the inner bearing member would merely result in its moving back on the conical shoulder and the full contact between it and the shoulder would be maintained. The height of the shoulder of the present construction is much less than that of prior art constructions; so that the amount of stock required to manufacture the axle is reduced. The machining of the bore of the inner bearing member is greatly facilitated by the elimination of the convexly curved portion and the substitution therefor of the two truly conical portions.

Obviously the present invention relates to the mounting of the inner bearing member on the axle against the shoulder and is not concerned with other details of bearing construction or arrangement.

What I claim is:

1. An axle bearing mounting comprising an axle having a conical shoulder and a bearing member mounted on said axle having a tapering bore portion fitting said conical shoulder.

2. In combination, an axle having a conical shoulder and an annular bearing member mounted on said axle, the end portion of the bore of said annular bearing member being tapered to fit said conical shoulder.

3. In combination, an axle having a conical shoulder with a concavely curved portion merging into the body of said axle and an annular bearing member mounted on said axle, the end portion of the bore of said annular bearing member being tapered to fit said conical shoulder and the bore of said annular member adjacent to said end portion being shaped to clear the curved portion of said shoulder.

4. In combination, an axle having a conical shoulder with a concavely curved portion merging into the body of said axle and an annular bearing member mounted on said axle, the end portion of the bore of said annular bearing member being tapered to fit said conical shoulder and the bore of said annular member adjacent to said end portion being less steeply tapered so as to clear the curved portion of said shoulder.

5. In combination, a railway car axle having a conical shoulder, an annular bearing member the end portion of whose bore is tapered to fit said conical shoulder and means for holding said bearing member in position on said axle against said shoulder.

6. In combination, a railway car axle having a conical shoulder, an annular bearing member the end portion of whose bore is tapered to fit said conical shoulder, means for holding said bearing member in position on said axle against said shoulder, an axle housing, an outer bearing member in said housing, means for holding said outer bearing member in position and bearing rollers interposed between said bearing members.

Signed at Canton, Ohio, this 6th day of June, 1931.

TRACY V. BUCKWALTER.